Oct. 13, 1964  E. RABE  3,153,157
ELECTROMOTOR
Filed Sept. 19, 1960  2 Sheets-Sheet 1
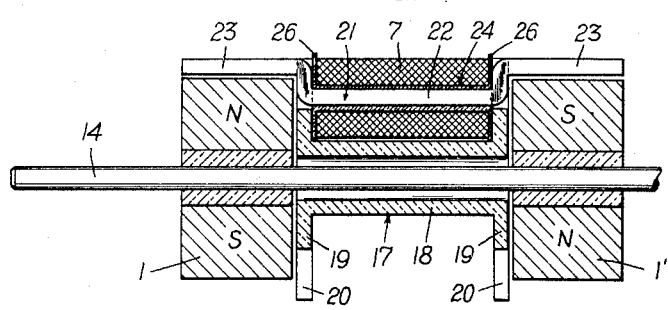
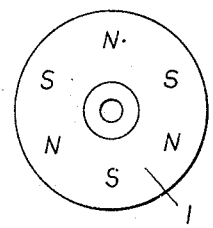
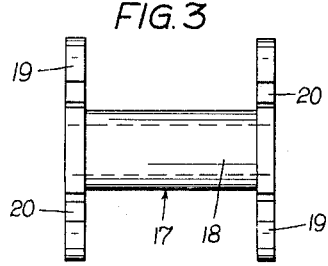
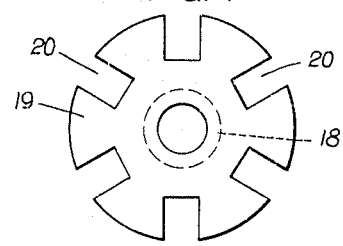
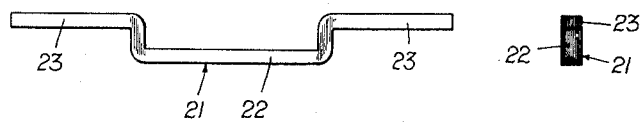
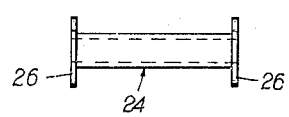
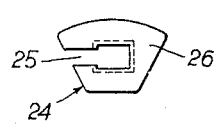
Inventor
ERICH RABE
By Toulmin & Toulmin
Attorneys Oct. 13, 1964  E. RABE  3,153,157
ELECTROMOTOR
Filed Sept. 19, 1960  2 Sheets-Sheet 2
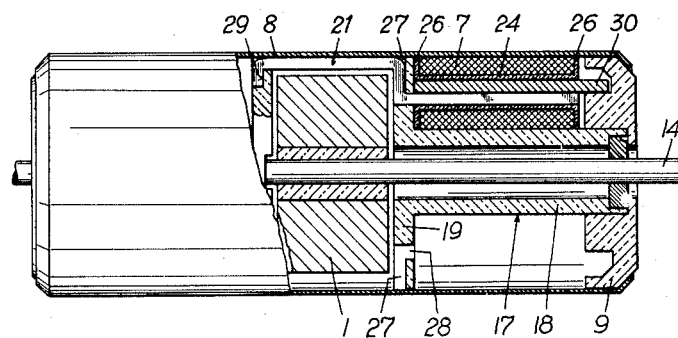
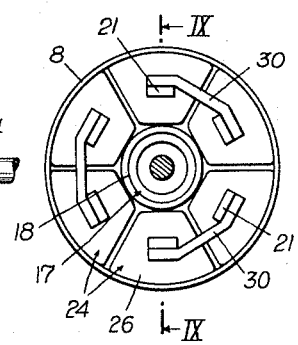
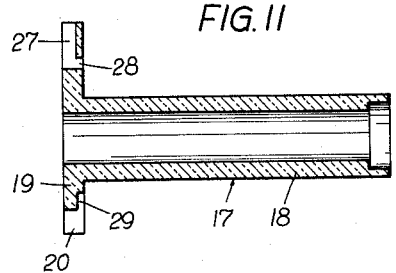
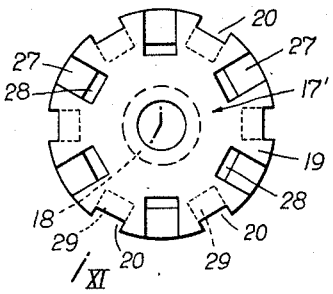
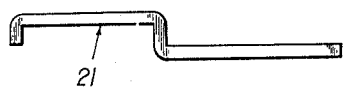
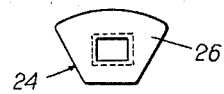
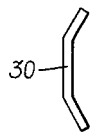
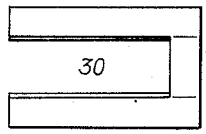
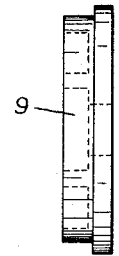
Inventor
ERICH RABE
By Toulmin & Toulmin
Attorneys

United States Patent Office
3,153,157
Patented Oct. 13, 1964

3,153,157
ELECTROMOTOR
Erich Rabe, Nurnberg-Muhlhof, Germany, assignor to Ernst Voelk, Nurnberg, Germany
Filed Sept. 19, 1960, Ser. No. 56,835
Claims priority, application Germany, Sept. 18, 1959, V 17,266
3 Claims. (Cl. 310—46)

The present invention relates to an electric motor, which is of high efficiency and simple and economic construction. According to the invention it is suggested that the magnetic fields for the stator windings of the rotor lie in series, and as rotor there are arranged one or more magnet wheels with axially or radially magnetised permanent poles, the magnetic fields of which emerge from the disc surfaces facing the stator windings or from the peripheral surfaces facing the pole plates, which extend above the circumference of the wheel in cage fashion, opposite magnetic poles following one another in the magnetic flux distribution, seen in each case in the direction of the motor axis, and in the case of the provision of a plurality of magnet wheels the stator windings are arranged therebetween, so that their magnetic flux passes through the magnet wheels. The magnetic flux can here be closed in each case at the end of the motor through the end rotor discs, which in such case are magnetically closed on their outer side in a manner known per se, or the stator windings lying at the end of the motor shaft are short-circuited by pole shoes in a manner known per se.

The motor constructed in accordance with the invention can largely be assembled by simple fitting together of a few individual parts, these individual parts largely being repeated in the individual motor.

Various forms of embodiment of electric motors constructed in accordance with the invention are illustrated by way of example in the accompanying drawings, wherein:

FIGURES 1 to 8 respectively illustrate a first form of embodiment of an electric motor constructed in accordance with the invention, FIGURE 1 being a central section through the assembled motor, only the lateral covers and the cylindrical sleeve being omitted, FIGURE 2, showing an end view of the rotor, FIGURES 3 and 4 respectively showing the stator body in front view and lateral elevation respectively, FIGURES 5 and 6 respectively representing a pack of pole plates in front view and lateral elevation respectively, and FIGURES 7 and 8 respectively showing a coil body in front view and lateral elevation respectively.

FIGURES 9 to 17 respectively represent a second form of embodiment of an electric motor constructed in accordance with the invention, FIGURES 9 and 10 respectively showing the entire motor in central section and lateral elevation respectively, FIGURES 11 and 12 respectively representing the stator body in front view and lateral elevation respectively, FIGURE 13 being a view of a pole plate, FIGURE 14 a lateral elevation of a coil body, FIGURES 15 and 16 representing a pole shoe in front view and lateral elevation respectively, and FIGURE 17 being a view of a lateral cover.

In the case of the example of this embodiment of a motor constructed in accordance with the invention, as illustrated in FIGURES 1 to 8, the rotor comprises only two magnet wheels 1 and 1″ (see FIG. 2 as front view thereof) and a stator winding 7 arranged between these two. For the retention of the stator winding and of the pole plates pertaining to the stator there is provided a stator body 17, which is received with its tubular central part 18 by shaft 14. Flanges 19 are provided at the two ends of this body 17 with each flange 19 being provided with six radial incisions 20. These incisions 20 receive the cranked portions of the pole packs 21. Each of these pole plate packs is surrounded in its middle part 22 by a stator coil 7, and is cranked outwards at its two ends at 23. A coil carrier 24 is disposed about the middle part 22 of each pole plate pack and is provided at 25 with a lateral slot, which is somewhat narrower than the radial extent of the middle part 22. Each coil carrier 24 is provided with two end flanges 26, which are also laterally slotted and are profiled in segment form to correspond to the desired number of poles. The coil carriers 24 are slided in lateral direction onto the pole plate packs 21, while the slots 25 are widened, and they return to their original position again after complete passage of the pole plate pack. Then the stator windings 7 are wound over these coil bodies 24.

The individual parts can be held together as described above by sleeve-shaped half-shells (not shown), having two respective lateral covers.

In the case of this embodiment the force lines of the magnetic field emerge radially from the peripheries of the magnet wheels, and the magnetic shunt is here closed by the pole plates.

It is possible to provide a plurality of magnet wheels instead of only two, and the pole plate packs must then be cranked at correspondingly more places. The use of laminated pole plates is not absolutely necessary in every case.

The embodiment according to FIGURES 9 to 17 differs from that according to FIGURES 1 to 8 essentially only in that here only one magnet wheel is provided, and there are stator windings on both ends. One may conceive this embodiment as a modification derived from the above-mentioned second embodiment due to the fact that for the former one of the two magnet wheels of the latter is omitted and on the opposite end of the remaining magnet wheel a further stator winding is arranged. This idea admittedly necessitates a somewhat different style of construction, and also a provision for proper closing of the magnetic flux path.

In this second embodiment a single manget wheel 1 is mounted on the central portion of shaft 2, and it is further assumed that this magnet wheel comprises three north and three south poles on each end (see FIG. 2). After sliding wheel 1 over the shaft and securing it thereto, two stator bodies 17 are respectively mounted, on the two shaft ends but disengaged therefrom. Each body 17 carries a single flange 19, having its outer end facing the magnet wheel 1. Stator body 17 again consists of insulating material, for example synthetic thermoplastic material or synthetic resin moulding mass, and can be extruded or pressed in a simple manner. Flange 19 has an opening surrounding the shaft 4 with adequae clearance and forms the continuation of the interior of tube 18. Tube 18 may have a circular or polygonal cross-section. It is possible, for example, to select an external profiling as $n$-sided figure, $n$ being the number of the poles on each end of the magnet wheel 1 and consequently being equal to the number of the coil carriers 24. In the present case $n=6$.

Flange 19 is provided with $n=6$ radial incisions 20, which are arranged at intervals of $360/n=60°$. The inner end of each radial incision 20 (FIG. 11) is adjoined on the side allocated to the tubular part 18 by a recess 29 of equal width, which however extends only approximately midway of the radial extension of flange 19. A channel-shaped recess 27 is provided in the center between two adjacent radial incisions 20, on the end of the flange 19 and remote from the tubular part 18, each recess 27 has similar width, and in radial direction is approximately similar length as recesses 29. Each of these recesses 27 is adjoined by a slot 28 of equal width and extending through flange 19 in axial direction. The pole plates 21 consist of soft iron rods of suitably selected permeability and have rectangular cross-section. Each rod is cranked twice, so that it is capable of grasping with its end which is more remote from the shaft around the magnet wheel 1 in cage fashion; the stator winding 7 is disposed along the other end of the rod.

The stator windings 7 are again wound on coil carriers 24 having lateral flanges 26. In contrast to the first embodiment, however, here the coil carriers 24 and their flanges are not laterally slotted, since they can be slided onto the pole plates 21 directly and in axial direction. Pole yokes are provided on the outer ends of the stator bodies 17 as magnetic shunt paths (pole yokes 30). There is one yoke for each pole pair; one of the yokes is illustrated in FIGURES 15 and 16.

For assembling the electric motor according to this embodiment the pole plates 21 are passed through the slots 28 of the flange 19 of one stator body and grasp the flange 19 of the other stator body while lying in the recess 20 of the latter flange. The middle piece of a pole plate lies in the channel-shaped recess 27 over the slot 28 through which it was passed. The two stator bodies 17 are thus fixed with regard to their mutual spacing, after insertion of the pole plates 21. Neighboring pole plates were passed through holes 28 of oppositely disposed flanges 19 and are positioned for magnetization into coils also pertaining to oppositely disposed coil carriers 24. The cranked ends of all of the pole plates here grasp the magnet wheel 1 in cage type fashion. The pole plates 21 extending into one coil carrier are offset on any one side of the magnet wheel 1 by 30° relative to those pole plates extending from the other flange. The coil carriers 24 are fitted onto the freely projecting ends of the pole plates 21 together with the respectively attached stator windings 7. One arm of a pole yoke 30 also is fitted into the opening of each coil carrier 24 which yoke consists of soft iron. Yoke 30 is passed with another arm into the opening of the coil carrier of an opposite pole.

The coil carriers 24 now are seated on the stator body 17. Since they also contact the flange 19 at the front, after the application of the coil bodies and pushing in of the pole yokes 30, a firm combination is produced, thus the stator bodies are fixed on both sides and form a uniform entity with the coils. The opening in each coil carrier must here be of such dimensions that the freely projecting part of the six pole plates 21 and the arm of the pole yoke 30 pertaining thereto fill this opening, sitting closely.

Obviously, the coil windings 7 must be electrically connected with one another according to the predetermined circuit plan, the arrangement of the individual parts in relation to one another is determined in accordance with the winding pitch, in a manner known per se.

A cylindrical sleeve 8 is expediently slided over the unit thus produced, which sleeve in the present case, however, does not have to be made in the form of two half-shells as in the former embodiments, but can be a single piece. Lateral covers 9 can again be mounted on to the two open ends of sleeve 8. These covers can be connected with the sleeve 8 in any suitable fashion, for example, by turning over the edges of the sleeve.

Machines constructed in accordance with the invention can naturally also be constructed in a manner known per se as motor generators. In this case one side of the coils is wound as motor, the opposite side as generator. Machines thus wound also deliver voltages shifted in phase very cleanly by 90°, and currents which, according to the nature of the phase angle on the generator side, possess defined ratios in relation to the primary phase.

The number of the pole plates provided can be increased or reduced, in a manner known per se. However according to known principles it must always amount to an even number. The arrangement of $2n$ pole plates as provided in the examples of embodiment according to FIGURES 9 to 17 has proved expedient. It increases the efficiency and the housing of an appropriate number of poles is possible without difficulty.

The motor constructed in accordance with the invention is extraordinarily simple to produce, its simple and few individual parts can be produced by mass production. The motor works very economically, for it avoids the remagnetization losses which occur in the iron cores of the stator windings. Furthermore by the avoidance of the remanence phenomena (mutual force influences between stator and rotor) a smooth, uniform running is achieved. The force flux of the magnet fields, achieved by the style of construction in accordance with the invention, renders it possible in a simple manner to combine a plurality of drive systems with the corresponding stator windings on one shaft into one unit, and thus to bring about a desired increase of output.

A further advantage for synchronous motors is obtained as regards starting up. Motors constructed in accordance with the invention, especially those with a plurality of magnet wheels, can be constructed in a simple manner so that starting difficulties are avoided. For this purpose it is merely necessary to rotate one magnet wheel a fraction out of its alignment with the other magnet wheels. Then as a result of the field asymmetry a torque necessarily occurs on starting up of the motor.

I claim:

1. Electric motor with stator and rotor, comprising: a shaft; said rotor comprising a permanently magnetized wheel having circumferentially disposed magnetic poles in alternating succession; said stator comprising a magnetically and electrically insulating tube received by said shaft, a flange integral with said tube and being disposed adjacent to, in axial direction of said rotor wheel, said flange having a larger diameter than said rotor wheel and having radially directed recesses, rod shaped pole members respectively supported by said flanges in said recesses and having a first portion extending axially from its supporting place at said flange, above said wheel, and having a second portion extending axis parallel to said tube radially displaced therefrom; said first portion having a larger radial distance from said shaft and the axis of rotation thereof than said second portion; and stator windings respectively on said rods.

2. Electric motor with stator and rotor comprising: a shaft; two circumferentially, permanently magnetized wheels, mounted on said shaft for rotation therewith and being axially displaced from each other; a tubular member received and cleared by the portion of said shaft between said wheels; flanges on said member, each being disposed adjacent one wheel and having a larger diameter than said wheels, there being radially directed slots in said flanges; elongated stator members each having two arms and a centrally cranked portion integral with the arms and being supported in said flanges, so that said central portion is disposed above and parallel to said tubular member while the arms of each stator member extend respectively above said wheels; sidewardly slotted, tubular coil carriers respectively receiving said central portion and being mounted on said tubular member; and stator coils on said coil carriers.

3. Electric motor with stator and rotor, comprising: a shaft; a circumferentially, permanently magnetized wheel mounted for rotation on said shaft; two stator bodies each including a tubular member made of electrically and magnetically insulating material, said members being received by said shaft adjacent said wheel; a radially slotted flange on each member integral therewith and adjacent said wheel, having a larger diameter than said wheel, a first plurality of rod shaped stator pole plates having an outwardly cranked portion disposed above said wheel and being received by slots in said flanges, and having a second portion extending parallel and above a first tubular member but closer to said axis as said cranked portion;

a second like plurality of similarly shaped stator pole plates having their cranked portions disposed interleafed to those of said first plurality and having their second portions disposed adjacent the other tubular member; tubular shaped coil carriers mounted on said tubular members and each one receiving a second portion of said rod shaped stator pole plates; coils on said coil carriers; and yoke means disposed to magnetically interconnect pairs taken only from said first plurality of pole plates and pairs of said second plurality of pole plates.

No references cited.